Oct. 1, 1968     F. N. CRAMER ET AL     3,403,938

FORE AND AFT ADJUSTABLE HEADREST

Filed March 17, 1967     2 Sheets-Sheet 1

INVENTORS
Frank N. Cramer, &
Jack L. Curry

E. J. Biskup

ATTORNEY

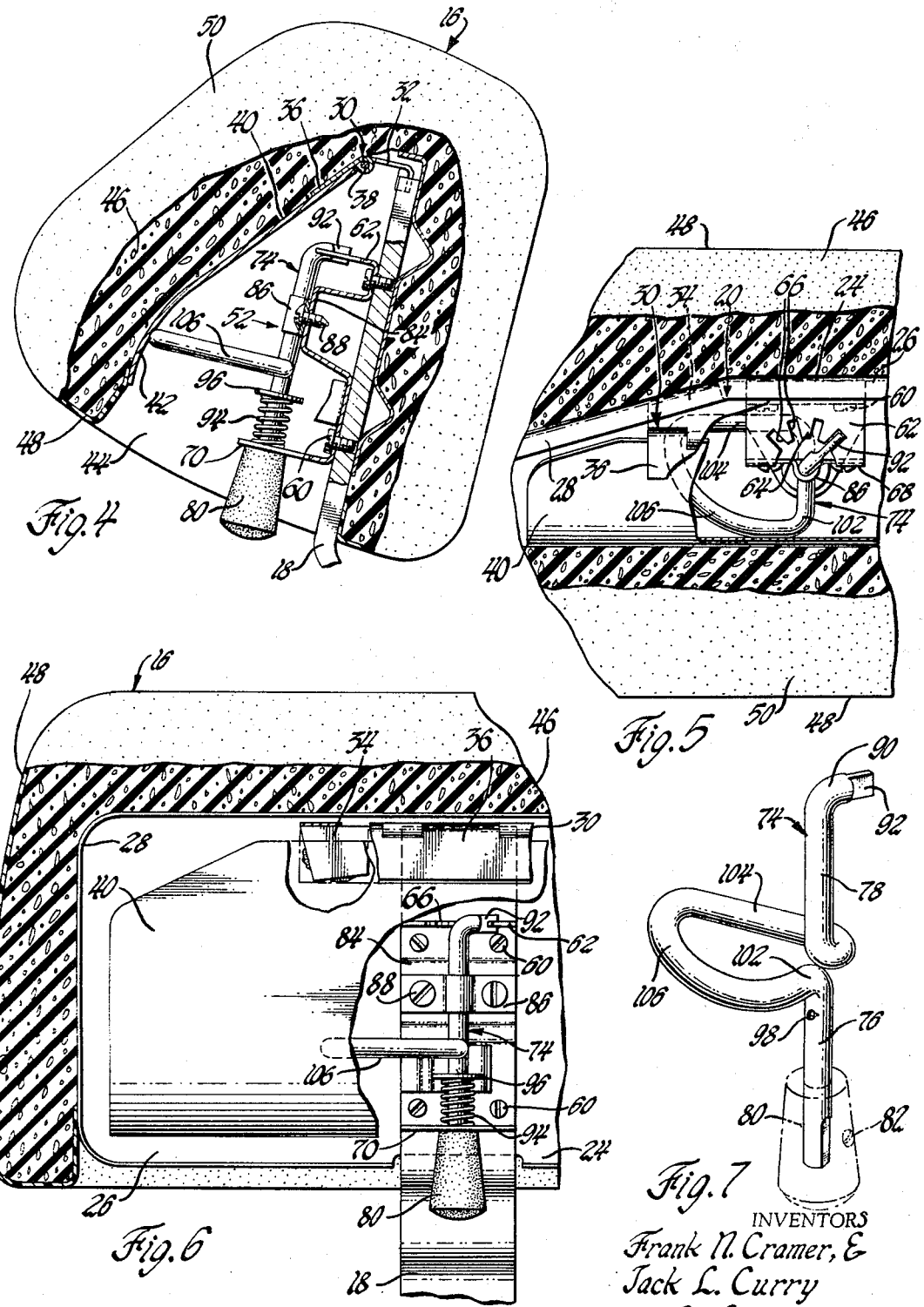

3,403,938
FORE AND AFT ADJUSTABLE HEADREST
Frank N. Cramer, Warren, and Jack L. Curry, Rochester, Mich., assignors to General Motors Corporation, Detroit, Mich., a corporation of Delaware
Filed Mar. 17, 1967, Ser. No. 623,940
8 Claims. (Cl. 297—391)

ABSTRACT OF THE DISCLOSURE

A vehicle headrest having a head support pad hinged to a fixed rear portion including a manually operated cam mechanism for selectively positioning the head support pad relative to the rear portion in the fore and aft direction.

---

Previously, adjustable headrests have used elaborate adjusting mechanisms that, in addition to being structurally complex, are frequently placed in inaccessible locations. In constructions of this type, the position of the headrest may not be readily or conveniently adjusted from the seated position. The present invention utilizes the receding or advancing surface of a rotatable cam member to impart forward or rearward movement to the hinged head support pad of a headrest. The cam mechanism, housed within a headrest cavity, is operable by means of a conveniently located control knob. The cam member may be selectively positioned so that the seat occupant can choose that head support pad position which he feels is best suited for his driving requirements.

Accordingly, the objects of the present invention are; to provide an adjustable headrest having a simple, rugged and durable construction; to provide an easily accessible adjusting mechanism for a headrest that is housed within a cavity formed in the headrest body and that may be selectively positioned fore and aft; and to provide an adjustable headrest wherein a hinged pivot panel which structurally supports a head support pad serves as a cam surface that is cooperable with a manually rotatable cam member to forwardly and rearwardly adjust the head support pad.

These as well as other features of the invention will be obvious to one skilled in the art from the following detailed description reference being made to accompanying drawings showing preferred embodiment in which:

FIGURE 4 is a view similar to FIGURE 2 with the head support pad in forward locked position;

FIGURE 5 is a view taken generally in a plane defined by line 5—5 of FIGURE 2;

FIGURE 6 is a view taken generally in a plane defined by line 6—6 of FIGURE 2; and FIGURE 7 is a perspective view of the cam member employed with the mechanism of FIGURES 1–6.

Figure 1:
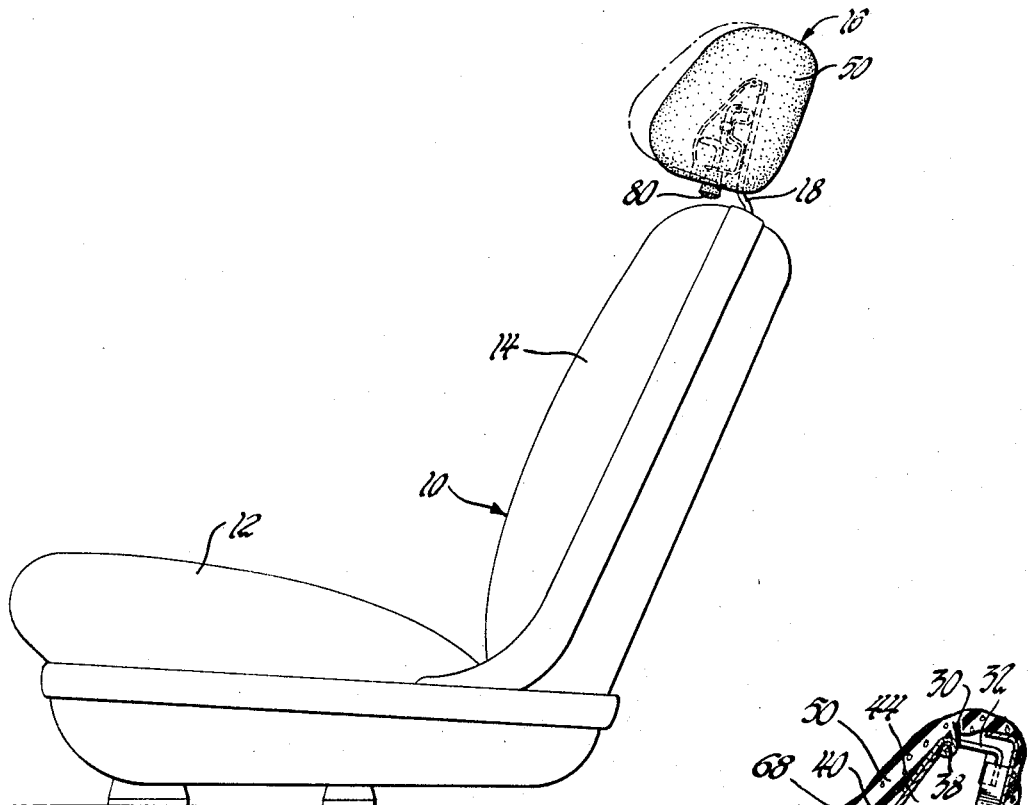
FIGURE 1 is a side elevational view of a vehicle seat embodying the adjustable headrest of this invention.

Referring to the drawings, FIGURE 1 shows a conventional vehicle seat 10 including seat member 12 and seat back rest 14. A headrest 16, according to this invention, is supportably held in position atop back rest 14 by the upper end of a support arm 18 which is suitably attached at the opposite end to the back rest 14. Preferably, the support arm 18 is releasably attached to the back rest 14 in a manner permitting vertical adjustment of the headrest. However, this feature forms no part of the present invention and the adjustment mechanism for this purpose is not shown.

The headrest 16 includes an interior rear panel assembly 20, formed of a suitable nondeformable material such as sheet metal or plastic. The panel assembly 20 has a generally vertically extending wall 24 which is centrally supported by and rigidly attached to the upper end portion 25 of the support arm 18 and includes wing portions 26 which, although not shown completely in FIGURE 5, will be understood to extend laterally outwardly from opposite sides of wall 24 and angle slightly forwardly to establish the desired contour for the rear portion of the headrest. A forwardly projecting flange 28 is formed about the peripheral edge of wall 24 and the wing portions 26 to give panel assembly 20 a generally dished shape. A hinge member 30 is received within panel assembly 20 adjacent the upper segment of flange 28 and comprises a stationary forwardly extending plate 32 having tabs 34 suitably welded or other wise fixed to the wing portions 26. The hinge member 30 also includes a movable plate 36 hingedly joined to plate 32 along a horizontal transverse axis in a conventional manner by pin 38. A generally flat front planel 40 having an inwardly curved lower edge 42 is secured at its upper end to movable plate 36 and is pivotally movable therewith about the aforesaid horizontal axis. The panel assembly 20 and the front panel 40 together form the inner frame support for the headrest 16 and define a cavity 44 therebetween which is closed at the top and open at the bottom or underside. An overlay of padding 46 consisting of any suitable padding material, such as foam rubber, surrounds the inner frame support of the headrest. An outer flexible covering 48 of a suitable material such as vinyl or leather covers the padding 46. As should be apparent, the hinged panel 40 and the material overlay form a head support pad 50 which is pivotally movable relative to the fixed rear portion of the headrest about the aforementioned hinge axis to provide fore and aft adjustment of the headrest.

An operating mechanism 52 located within cavity 44 provides adjustment capability for head support pad 50, permitting it to be adjustably positioned in accordance with the preferences or requirements of the seat occupant. The mechanism 52 includes a support bracket 54 which may be formed of a sheet metal stamping and has rearwardly directed segments 56 and 58 which are attached to end portion 25 of the support arm 18 by screws 60. The upper end portion 62 of support bracket 54 extends generally horizontally forwardly from segment 56 and has an arcuately recessed outer edge surface 64 formed with a plurality of radially diverging recesses or positioning slots 66 which radiate from a center axis located approximately in line with the outermost edge 68 of end portion 62. The lower end portion 70 of support bracket 54 extends generally horizontally forwardly in a plane parallel to that of upper end portion 62 and has an aperture 72 formed therein. A cam member 74, preferably formed of a round metal rod, has generally vertically extending aligned portions 76 and 78. The portion 76 is received through aperture 72 and extends downwardly a sufficient distance so that an actuator knob 80 may be attached to the end thereof with a set screw 82. The portion 78 extends upwardly adjacent the intermediate segment 84 of support bracket 54 and is supported thereat by a bracket 86 which is secured at its outer ends to segment 84 with screws 88. As supported, the cam member 74 is freely rotatable and axially movable relative to support bracket 54. The portion 78 terminates in a generally horizontally extending rearwardly directed arm 90 having a rectangularly shaped key 92 at the end thereof receivable in slots 66 to lock the cam member 74 to the support bracket 54. The rotational axis of cam member 74 generally corresponds to the center axis of slots 66 so that key 92 is selectively engageable with each slot 66 as cam member 74 is rotated. The key 92 is spring biased into locking engagement with slots 66 by means of a cam return spring 94 which is compressively held between portion 70 and a flat washer 96 received about portion 76 and located thereon against dimples 98. When the key 92 is engaged in slot 66, the knob 80 seats against portion 70 and acts as a stop.

The cam member 74 also includes straight leg segments 102 and 104 and an arcuately shaped segment 106 formed integrally with portions 76 and 78 and lying in a plane perpendicular thereto. The segment 106 continuously engages the adjacent surface of the front panel 40 so that rotational movement of the cam member adjusts the headrest 16 forwardly and rearwardly.

Figure 2:
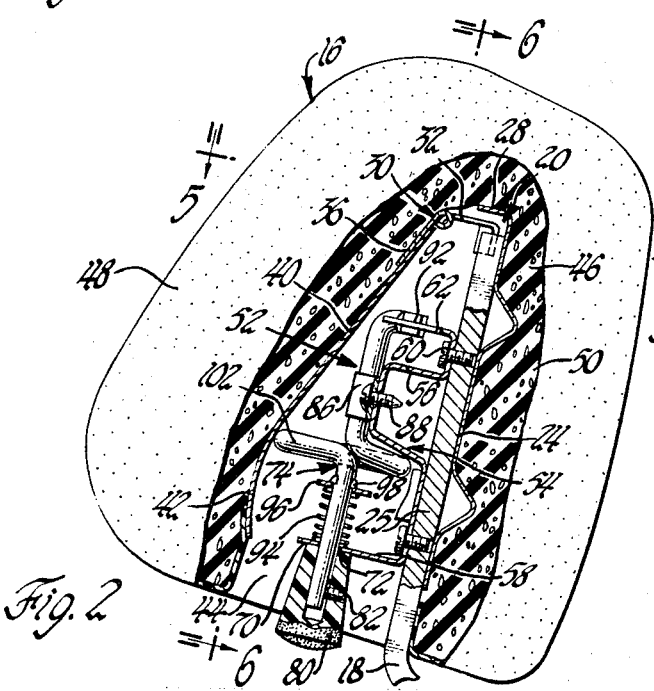
FIGURE 2 is an enlarged sectional view of the headrest of FIGURE 1 showing the adjustment mechanism in the locked position and the head support pad in the retracted position.

As will be apparent by referring to FIGURE 7, the range of adjustment is determined by the differential lengths of straight leg segments 102 and 104. Thus, as shown in FIGURES 2 and 5, the headrest pad 50 is in the fully retracted position when cam member 74 is adjusted so that the shorter leg 102 extends axially forward while, as shown in FIGURE 4, the headrest pad 50 is in the most forwardly adjusted position when cam member 74 is rotated approximately 90° from the former position so that the longer leg 104 extends axially forward. The headrest pad 50 can be adjusted to any of a plurality of positions as intermediate portions of arcuate cam segment 106 engage front panel 40; the number of adjustment positions corresponding to the number of positioning slots 66 into which cam member 74 can be keyed.

Figure 3:
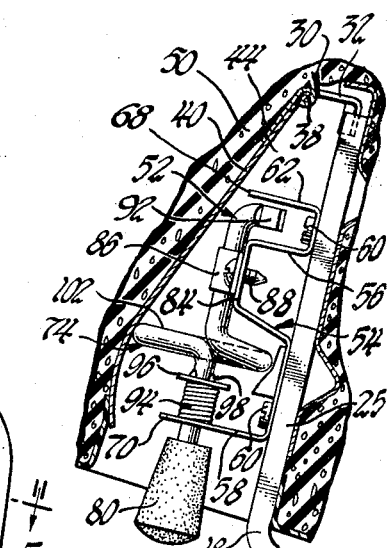
FIGURE 3 is a view similar to FIGURE 2 with portions of the headrest removed, showing the adjustment mechanism in the unlocked position.

As shown in FIGURE 3, the headrest pad 50 is adjusted to the desired position by first pulling downwardly on knob 80, thereby freeing key 92 from slot 66. The cam member 74 is then rotated until key 92 is aligned with the desired positioning slot 66. During the rotational movement of the cam member 74, the head support pad 50 is pivoted about hinge pin 38 and the lower portion thereof moves fore and aft depending on the direction of movement of the cam member. When the desired position of the pad 50 is reached, the knob 80 is released and cam member 74 is biased upwardly by expansion of the cam return spring 94 until the key 92 engages the corresponding positioning slot 66, thereby locking the adjustment mechanism 52.

Since various changes and modifications will be apparent to one skilled in the art, the invention, as defined in the appended claims, is intended to cover such alterations of the described preferred embodiment.

What is claimed is:

1. A headrest comprising, a rear portion adapted to be fixedly supported relative to a seat back rest, a front portion pivotally connected to said rear portion and adapted to be adjusted about the pivotal connection to a plurality of positions relative to said rear portion, a cam surface on the interior of said front portion, and manually operable cam means carried on said rear portion opposite said cam surface and including a cam segment in engagement with said cam surface for locating said front portion in adjusted position, whereby selective adjustment of said front portion is effected by manipulation of said cam means causing said cam segment to recede or advance relative to said cam surface.

2. The invention of claim 1 wherein said front portion includes a head support pad of resilient material.

3. The invention recited in claim 1 wherein said cam means includes a support bracket secured to the inner surface of said rear portion opposite said cam surface, and a cam member carried by said support bracket and including an arcuately shaped cam segment engageable with said cam surface, said cam member being movable relative to said cam surface.

4. The invention recited in claim 3 wherein said cam segment includes short and long leg segments and an arcuate segment interconnecting said leg segments.

5. The invention recited in claim 3 and further including means for locking said cam member to said support bracket in positions corresponding to each of the headrest adjustment positions.

6. The invention as recited in claim 5 wherein said means for locking said cam member includes a key formed on said cam member and slots formed in said support bracket, said key being selectively engageable with said slots.

7. The invention recited in claim 6 wherein said key on said cam member is spring biased into engagement with said slots in said support bracket and said cam member is movable against the spring force to disengage said key from said slot to free said cam member for rotation.

8. An adjustable headrest comprising, a rear portion adapted to be fixedly supported relative to the back rest of a seat, a front portion pivotally connected to said rear portion and adapted to be adjusted about the pivotal connection to a plurality of positions relative to said rear portion, the facing inner surfaces of said portions defining a cavity therebetween open at the bottom of said headrest, and cam means carried by one of said facing surfaces within said cavity and engageable with the other of said facing surfaces, said cam means being operable through the cavity opening to adjust said front portion to a desired position.

References Cited

UNITED STATES PATENTS

| | | | |
|---|---|---|---|
| 2,828,810 | 4/1958 | Barecki et al. | 297— 408 X |
| 2,990,008 | 6/1961 | Bien | 297—397 |
| 3,121,592 | 2/1964 | Anderson | 297—284 |
| 3,226,159 | 12/1965 | Binding | 297—397 |
| 3,241,879 | 3/1966 | Castello et al. | 297—284 |
| 3,328,082 | 6/1967 | Lilleso | 297—397 |
| 3,337,268 | 8/1967 | Belk | 297—397 |

CASMIR A. NUNBERG, *Primary Examiner.*